United States Patent
Takamoto et al.

(10) Patent No.: US 6,297,905 B1
(45) Date of Patent: Oct. 2, 2001

(54) PORTABLE SCREEN ASSEMBLY

(75) Inventors: Hideo Takamoto; Tetsujiro Omura, both of Chuo-ku; Kazuharu Seki, Setagaya-ku, all of (JP)

(73) Assignee: Izumi-Cosmo Co., Ltd., Osaka (JP)

( * ) Notice: Subject to any disclaimer, the term of this patent is extended or adjusted under 35 U.S.C. 154(b) by 0 days.

(21) Appl. No.: 09/378,574

(22) Filed: Aug. 20, 1999

(30) Foreign Application Priority Data

Aug. 20, 1998 (JP) .................................................. 10-234542
Jan. 13, 1999 (JP) .................................................. 11-006345

(51) Int. Cl.⁷ .............................. G03B 21/60; G03B 21/56
(52) U.S. Cl. ........................................... 359/461; 359/443
(58) Field of Search ...................................... 359/461, 443

(56) References Cited

U.S. PATENT DOCUMENTS

| 1,669,052 | * | 5/1928 | Gusman et al. | 40/514 |
| 1,915,944 | | 6/1933 | Nagel | 160/24 |
| 4,171,592 | * | 10/1979 | Saitoh | 446/456 |
| 6,191,886 | * | 2/2001 | Sinkoff | 359/443 |

* cited by examiner

Primary Examiner—Russell Adams
Assistant Examiner—Magda Cruz
(74) Attorney, Agent, or Firm—Wenderoth, Lind, & Ponack, L.L.P.

(57) ABSTRACT

A portable screen assembly includes a spring-biased roll rotatably mounted to a lower casing, and a screen rotatably mounted at one end thereof to a top bar. The screen is set to a desired height by adjusting a repulsive force for a descent of the screen, and an upward biasing force of a height retaining device engaged with an expansion device against gravity and an elastic force of a spring attached to the spring-biased roll.

20 Claims, 8 Drawing Sheets

PORTABLE SCREEN ASSEMBLY

BACKGROUND OF THE INVENTION

1. Field of the Invention

The present invention relates generally to a screen for displaying, on an enlarged scale, an image projected by a projector or a projection TV set and in particular but not exclusively to a portable screen assembly that is easy to carry and can be installed at an optional location such as, for example, on a floor, a table or the like.

2. Description of the Prior Art

An image projected by a projector or, in some cases, a projection TV set is generally displayed, on an enlarged scale, on a reflection type screen or on a transmission type screen.

Of such screens, some are generally accommodated in a housing mounted on a ceiling or a side wall, and are electrically or manually extended as the occasion demands. Hanging screens or screens with a tripod are used by hanging or locating them at a desired place.

Portable screen assemblies are today available in which a screen is wound around a roll housed in a housing. When such screen assemblies are in use, the housing is initially installed at a desired place, and the screen is subsequently extended by, for example, an extension means somewhat similar to a pantograph by the action of the biasing force of a spring mounted therein.

Recently, the number of meetings or conferences has increased in companies or offices and there is an increasing demand for a portable screen assembly having a simple structure that is easy to carry with a projector and can be installed on a floor, a desk or a table in a conference room to display an image projected by the projector.

Further, there is a problem with the conventional pantograph that the pantograph is hard to get balanced laterally (i.e., in right and left symmetry) when it is lifted, and this tends to cause the top bar to tilt. As a result, the screen is wound around the spring-biased roll in a bamboo-like fashion, thus tending to cause the trouble of damaging the screen.

Another problem is that where arms of the pantograph and the spring-biased roll are mounted in an axially misaligned condition, the spring-biased roll and the top bar are not in axially parallel alignment when the screen is stretched and this causes the screen to distort. However, high precision is required to eliminate the possibility of such a problem of distortion when mounting the constituent parts to the pantograph and the pantograph to the lower casing, which results in a high cost of fabrication.

SUMMARY OF THE INVENTION

The present invention was made in view of such requirements and problems and is intended to provide a portable screen assembly which can be readily transported together with a projector and is easy to handle and which is simple in construction and less expensive.

According to an aspect of the present invention, there is provided a portable screen assembly, which includes an upper and a lower casing, a spring-biased roll rotatably mounted on the lower casing, a screen having first and second ends that are opposite to each other and wound around the spring-biased roll at a rest position, a top bar secured to the first end of the screen, a pantograph type expansion means rotatably mounted at one end thereof to the top bar and at the other end thereof to the lower casing for biasing the top bar upwards, and a height retaining means engaged with a portion of the expansion means so as to maintain the screen at a desired height.

The height retaining means preferably includes one of a gas spring and a coil spring.

The expansion means preferably includes six arms, first and second arms being rotatably mounted at one end thereof to an intermediate portion of the lower casing, respectively, the first arm being rotatably connected at the other end thereof to one end of a third arm, the second arm being rotatably connected at the other end thereof to one end of a fourth arm crossing the third arm and rotatably engaged at the intermediate portion of the fourth arm, the other end of the third arm being rotatably connected to one end of a fifth arm, the other end of the fourth arm being rotatably connected to one end of a sixth arm, and the fifth and sixth arms being rotatably mounted at the other ends thereof to the intermediate portion of the top bar.

The fifth and sixth arms can be rotatably mounted at one end thereof to a mounting member, the mounting member being horizontally rotatably mounted to the top bar.

A buffer means is preferably fixed to the lower casing so as to absorb a shock exerted on the lower casing by the expansion means during a folding of the expansion means.

The buffer means preferably includes a leaf spring.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals.

DETAILED DESCRIPTION OF THE PREFERRED EMBODIMENTS

The present disclosure relates to subject matter contained in applications No. 10-234542 and No. 11-006345 filed May 30, 1998 and Jan. 13, 1999, respectively, in Japan, which are expressly incorporated herein by reference in their entirely.

First Embodiment

Figure 1:
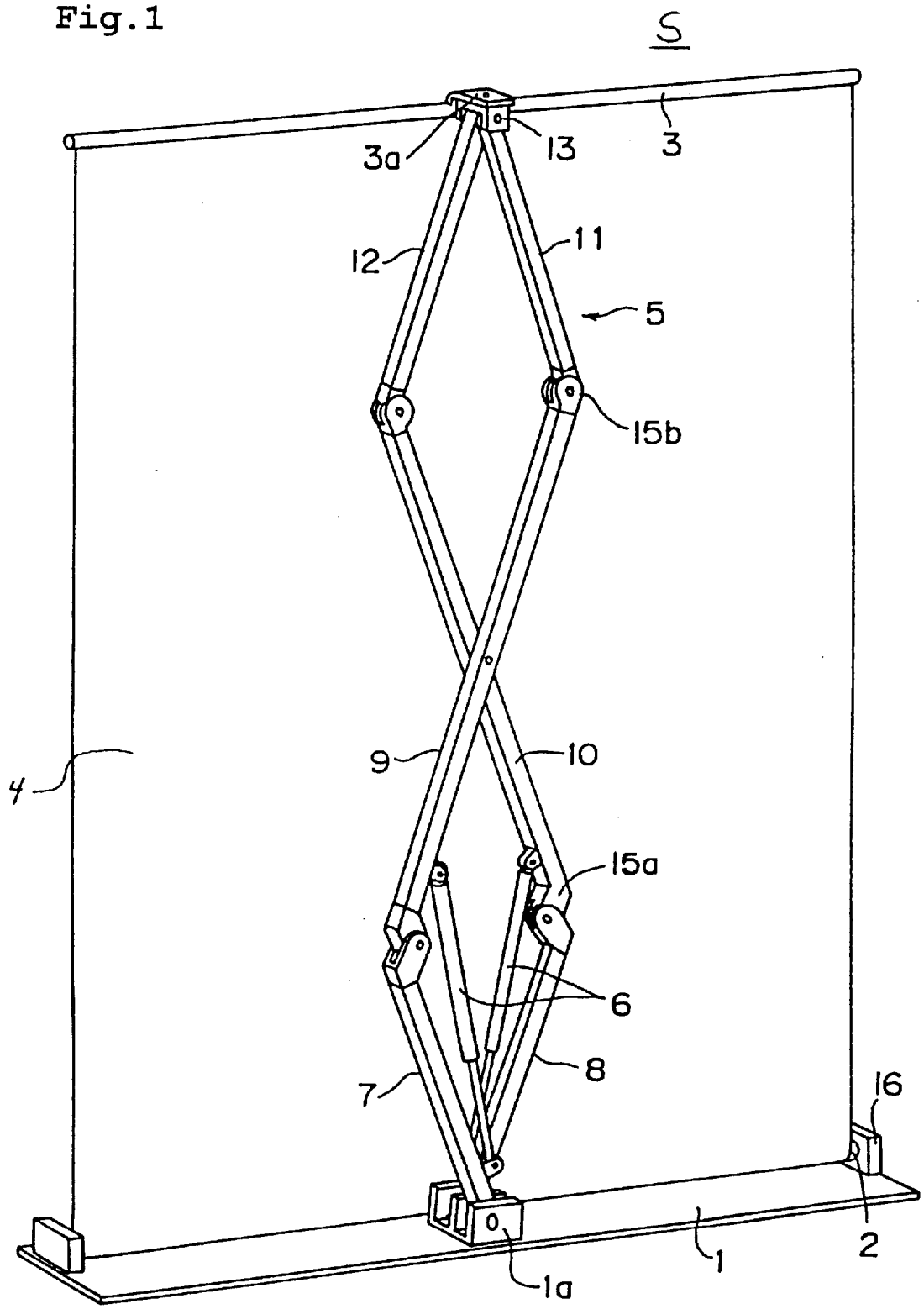
FIG. 1 is a perspective view of a portable screen assembly S according to a first embodiment of the present invention.

FIG. 1 illustrates a portable screen assembly S according to the first embodiment of the invention during use thereof. The portable screen assembly S includes a lower casing 1, a spring-biased roll 2 mounted to the lower casing 1 through mounting members 16, a screen 4 extended between a top bar 3 and the spring-biased roll 2, a pantograph type expansion means 5 for biasing the top bar 3 via a bracket or handle 3a so as to maintain the screen 4 at a desired height, and a height retaining means 6 including a gas spring.

The screen 4 is a known one that has a base fabric made of, for example, glass or PET, a reflective layer bonded to the base fabric, a bead layer or a polarization layer formed on the reflective layer, and a resin layer covered on the bead or polarization layer.

Figure 2:
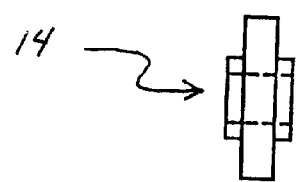
FIG. 2 is a fragmentary side view of a spacer portion 14a used for arm coupling in the first embodiment of the present invention.
Figure 10A:
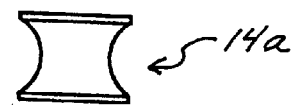
FIG. 10A is a side elevation view of the spacer member 1a used for arm coupling in the second embodiment of the present invention.
Figure 10B:
FIG. 10B is a top plan view of the spacer member 14a used for arm coupling in the second embodiment of the present invention.
Figure 11A:
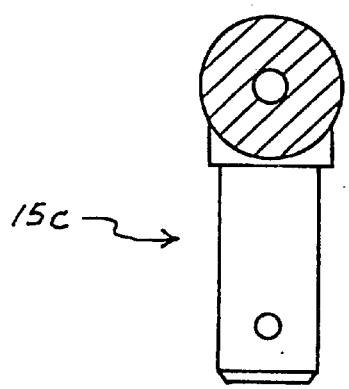
FIG. 11A is a front view of an end portion member 15c for use in arm coupling in the second embodiment of the present invention.
Figure 11B:
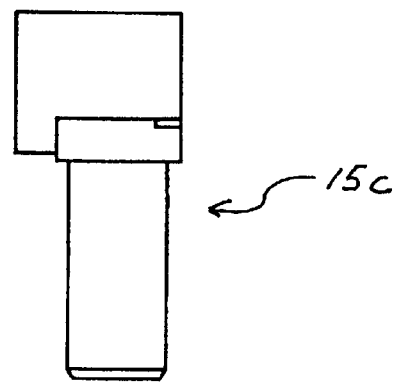
FIG. 11B is a side view of the end portion member 15c for use in arm coupling in the second embodiment of the present invention.
Figure 3A:
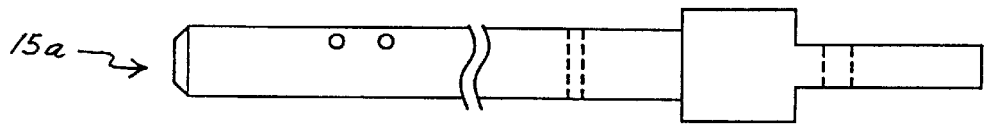
FIG. 3A is a top plan view of a convex portion of a pair of end portion materials 15a in the first embodiment of the present invention.
Figure 3B:
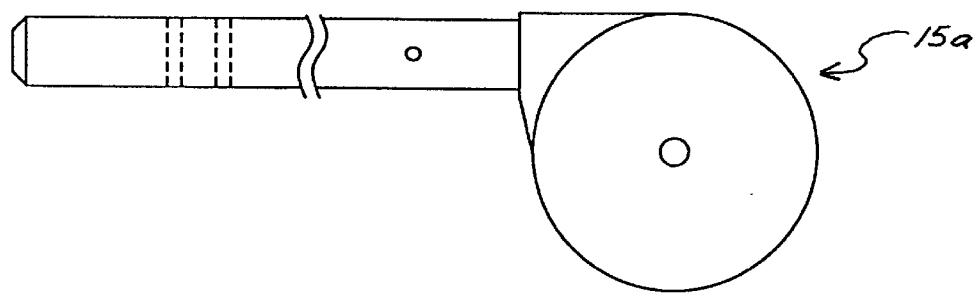
FIG. 3B is a side elevation view of a convex portion of a pair of end portion materials 15a in the first embodiment of the present invention.
Figure 4A:
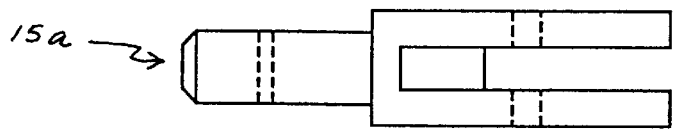
FIG. 4A is a top plan view of a concave portion of a pair of end portion materials 15a in the first embodiment of the present invention.
Figure 4B:
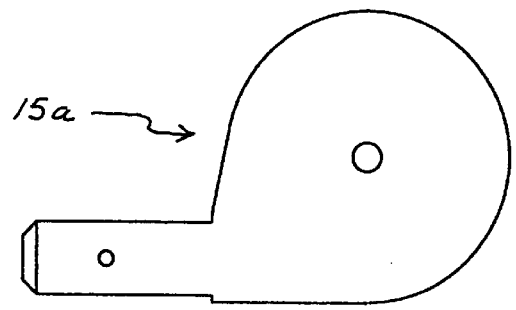
FIG. 4B is a side elevation view of a concave portion of a pair of end portion materials 15a in the first embodiment of the present invention.
Figure 5A:
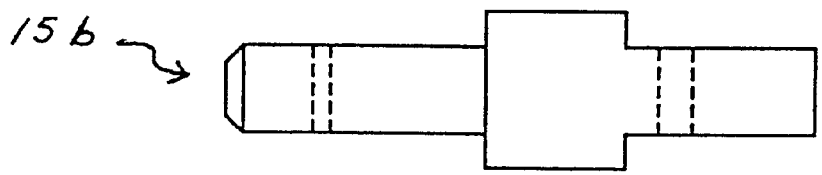
FIG. 5A is a top plan view of a convex portion of a pair of end portion materials 15b in the first embodiment of the present invention.
Figure 5B:
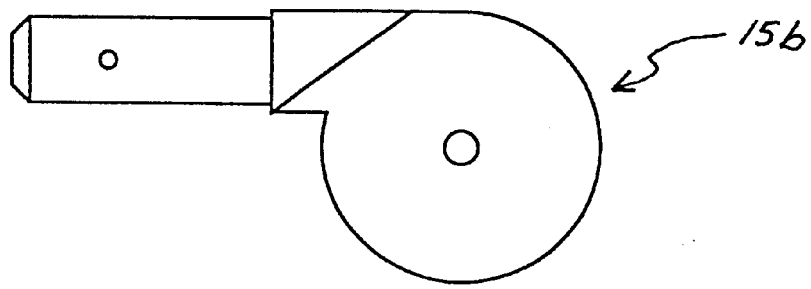
FIG. 5B is a side elevation view of a convex portion of a pair of end portion materials 15b in the first embodiment of the present invention.
Figure 6A:
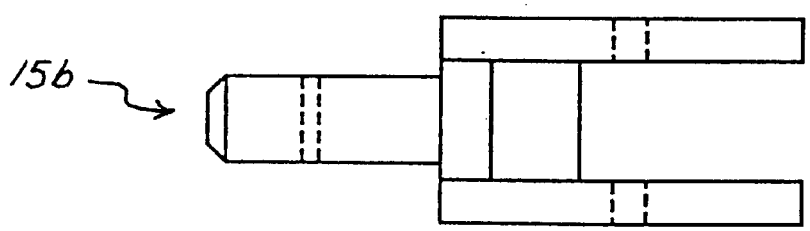
FIG. 6A is a top plan view of a concave portion of a pair of end portion materials 15b in the first embodiment of the present invention.
Figure 6B:
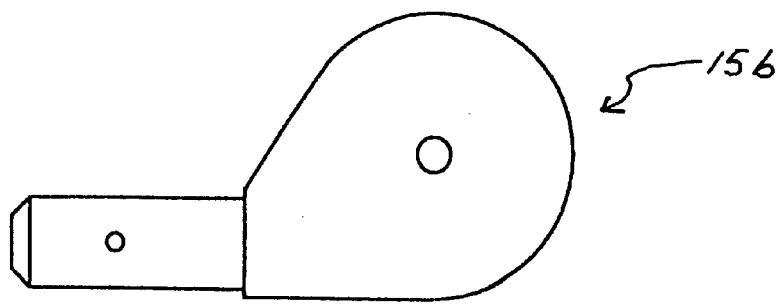
FIG. 6B is a side elevation view of a concave portion of a pair of end portion materials 15b in the first embodiment of the present invention.

As FIG. 1 shows, the expansion means 5 includes six arms of aluminum made rectangular hollow pipes, with the first arm 7 and second arm 8 rotatably mounted on a W-shaped member 1a in an intermediate portion of the lower casing 1. Subsequently, the other end of the first arm 7 is rotatably coupled to one end of a third arm 9 through a pair of end members 15a, 15b shown in FIGS. 3A, 3B and FIGS. 4A, 4B, and one end of a fourth arm 10 crossing the third arm 9 and rotatably engaged at an intermediate portion through a spacer member 14 shown in FIG. 2 is rotatably coupled to the other end of the second arm 8 through the end member 15a. Then, the other end of the third arm 9 is rotatably coupled to one end of a fifth arm 11 through a pair of an end member 15b shown in FIGS. 5A, 5B and FIGS. 6A, 6B, and the other end of the fourth arm 10 is rotatably coupled to one end of a sixth arm 12 through the end member 15b. Further, other ends of fifth arm 11 and sixth arm 12 are rotatably coupled through spacer member 14 (see FIG. 8) and rotatably mounted in a U-shaped member 13 which, in turn, is horizontally rotatably mounted by means of double nut screw or E-ring in the bracket 3a provided at an intermediate portion of the top bar 3.

As shown in FIG. 1, one of the pair of gas springs 6 is used as height retaining means and is engaged at opposite ends thereof with first arm 7 and third arm 9, respectively, through the coupler portion. The other of the pair of gas springs 6 is engaged at opposite ends thereof so that a repulsive force of gas pressure can be generated against the gravitational force and the elastic force of a spring(not shown) of the spring-biased roll.

Figure 7:
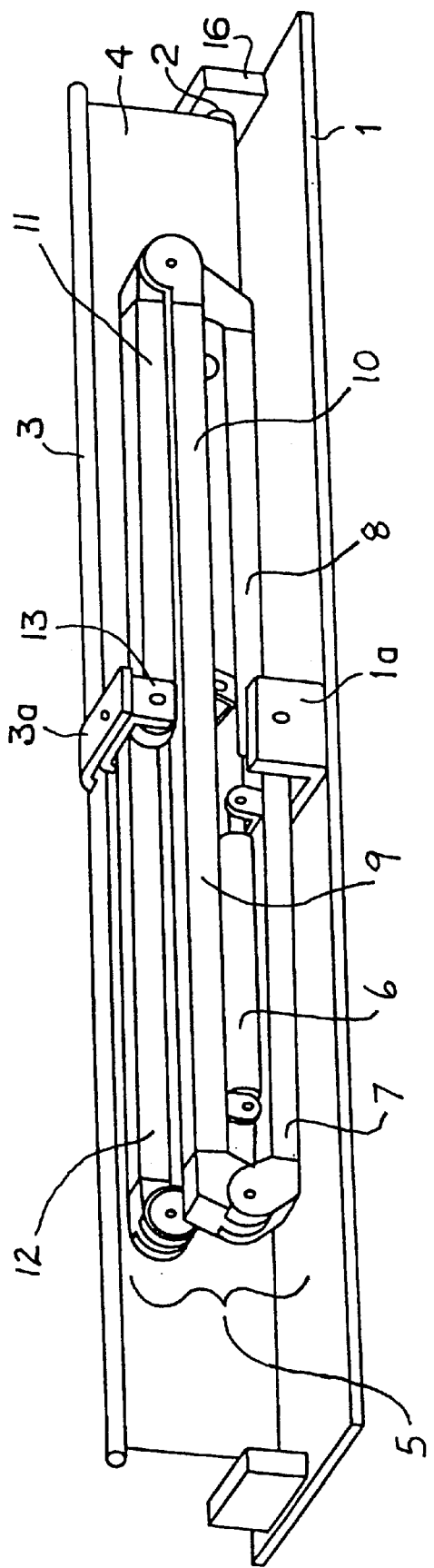
FIG. 7 is a perspective view showing the portable screen S of FIG. 1 in a folded condition.
Figure 8:
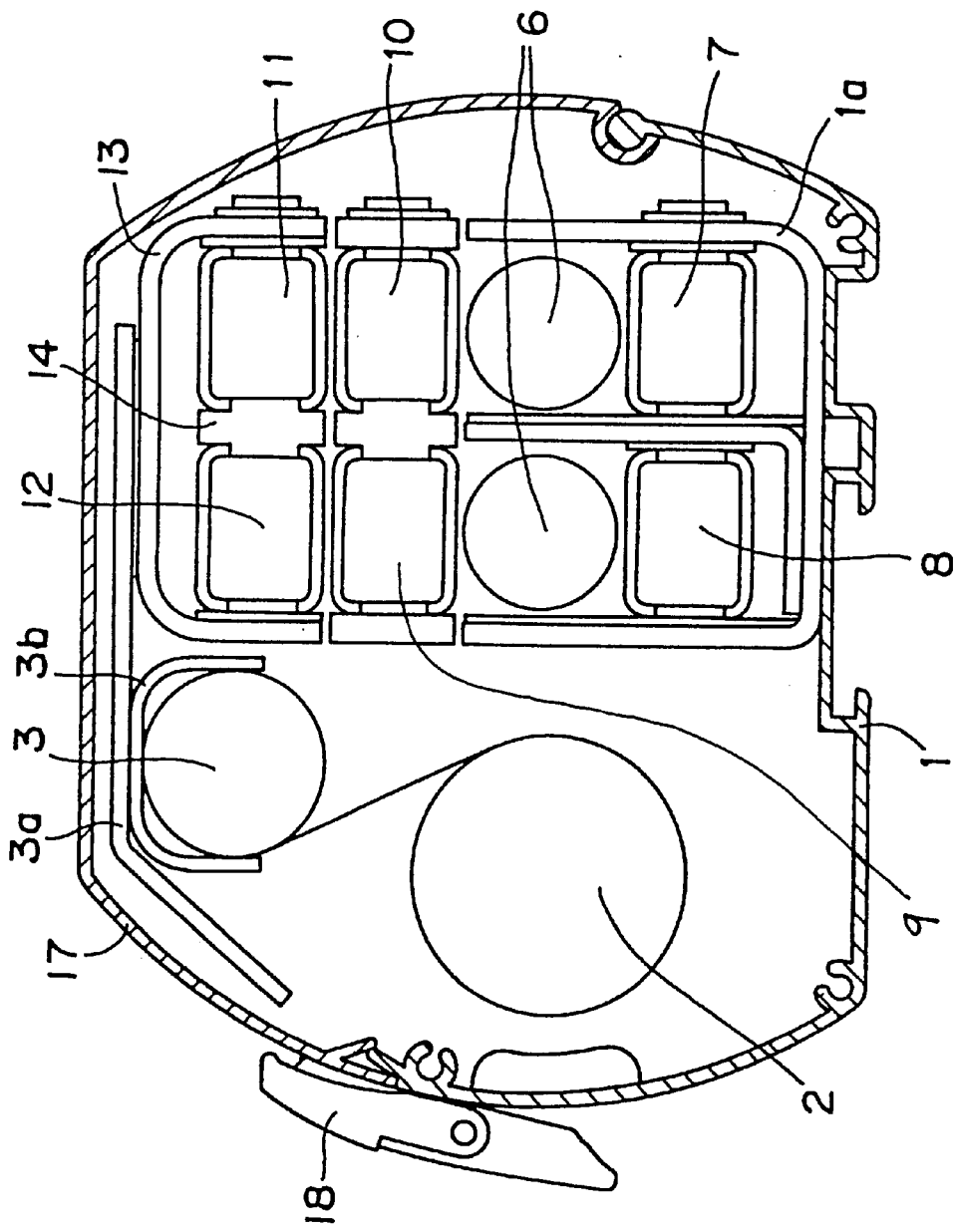
FIG. 8 is a vertical sectional view showing the portable screen S of FIG. 1 housed in the casing.

FIG. 7 illustrates the condition of the portable screen assembly S of the invention when not in use. The pantograph type expansion means 5 is folded toward the lower casing. As shown in FIG. 8, which presents a longitudinal sectional view of FIG. 7, the portable screen assembly S is covered by the upper casing 17, locked by locking means 18, and then housed in the casing.

Function of the portable screen assembly S of the above described construction of the invention will be described hereinbelow.

When the screen is not in use, the expansion means 5 is folded into a generally rectangular shape as shown in FIG. 7. Accordingly, the screen is easy to store and transport. In such a condition, the screen 4 is completely wound on a spring-biased roll 2 under the elastic force of the spring mounted to the spring-biased roll 2, and the six arms 7, 8, 9, 10, 11, 12 which constitute the expansion means 5 are completely folded as shown in FIG. 7 and extend approximately in parallel to the spring-biased roll 2.

When in use, top bar 3 is moved upward by grasping and upwardly pulling handle 3a, whereupon the screen 4 is pulled out from the spring-biased roll 2 against the elastic force of the spring mounted to the spring-biased roll 2 and the gravitational force.

A high-pressure gas is enclosed in the gas spring through a piston having orifices and is designed to adjust any volumetric changes within the cylinder due to stretch and retract motion of the piston rod indirectly through oil or directly through changes in gas pressure. When the screen 4 moves downward, piston rod is compressed to generate a repulsive force of a gas pressure within the gas spring, thereby to inhibit downward movement of screen 4. Accordingly, the screen 4 can be set to any desired height. Further, downward movement of screen 4 can be positively controlled through frictional resistance of rotatably fitted hinge portions of arm end members 15a and 15b.

Where resin-made end members are used, a metallic spacer may be interposed between male and female portions of the hinge portions. Through this arrangement the frictional resistance of the hinge portions is increased so that the friction between male and female portions of the hinged portion can be prevented, so there is no possibility of unpleasant noise generation due to friction of individual resin members even when the hinged portions are clamped together. Further, application of a lubricant makes it possible to obtain a stable frictional resistance without heat generation at the hinged portion even when the top bar is continuously moved upward and downward.

A coil spring can be mounted to the engaging portion intermediate between the third arm 9 and the fourth arm 10, thereby to exert an upward biasing force to the third arm 9 and fourth arm 10, and further to control the downward movement of the screen.

The expansion means 5 is connected to the lower casing 1 and top bar 3 at only their respective center portions and, therefore, as compared with the conventional method in which the expansion means is securely fixed to the lower casing and top bar at not less than two points, it is easier to equalize the frictional resistance of the hinged portions, right and left, and the repulsive force of the gas spring and, therefore, it is easier to laterally well balance the screen 4.

The expansion means 5 are horizontally rotatably mounted to the top bar 3 unlike the conventional method in which the expansion means is securely mounted to the top bar directly. Therefore the screen 4 tends to be pulled downward to the shortest length under the spring force of spring-biased roll 2 even when the upper and lower axes, or axial direction of the expansion means 5 and axial direction of the spring-biased roll 2 are slightly misaligned. Accordingly, the top bar 3 rotates in angularity parallel relation to the spring-biased roll 2, and thus the twist of the screen 4 can be eliminated. Therefore, high precision is not necessarily required with respect to component parts of the expansion means 5, mounting parts, and during the process of mounting the expansion means 5 to the lower casing.

Further, when storing the screen, by only depressing the top bar 3, the screen 4 descends slowly to be folded with no possibility of falling. Accordingly, the screen 4 is wound on the spring-biased roll 2 at a rest position and is stored in the casing after being rotated, as shown in FIG. 7.

In connection with this, by using a gas cylinder of the free piston type containing oil therein, any possible falling of the expansion means during downward movement can be prevented more effectively. The free-piston type gas spring includes a piston having an orifice provided at the interior front end of the cylinder, such that when the expansion means goes closer to the completely folded condition, the piston rod of the gas spring is forced to move deep into the cylinder, whereupon the piston reaches the oil to press the oil, and then a rapid pressing of the rod is prevented. Thereafter, oil gradually passes the orifice, so that the rod is gradually pushed inward, and the expansion means is slowly folded.

Second Embodiment

Figure 9:
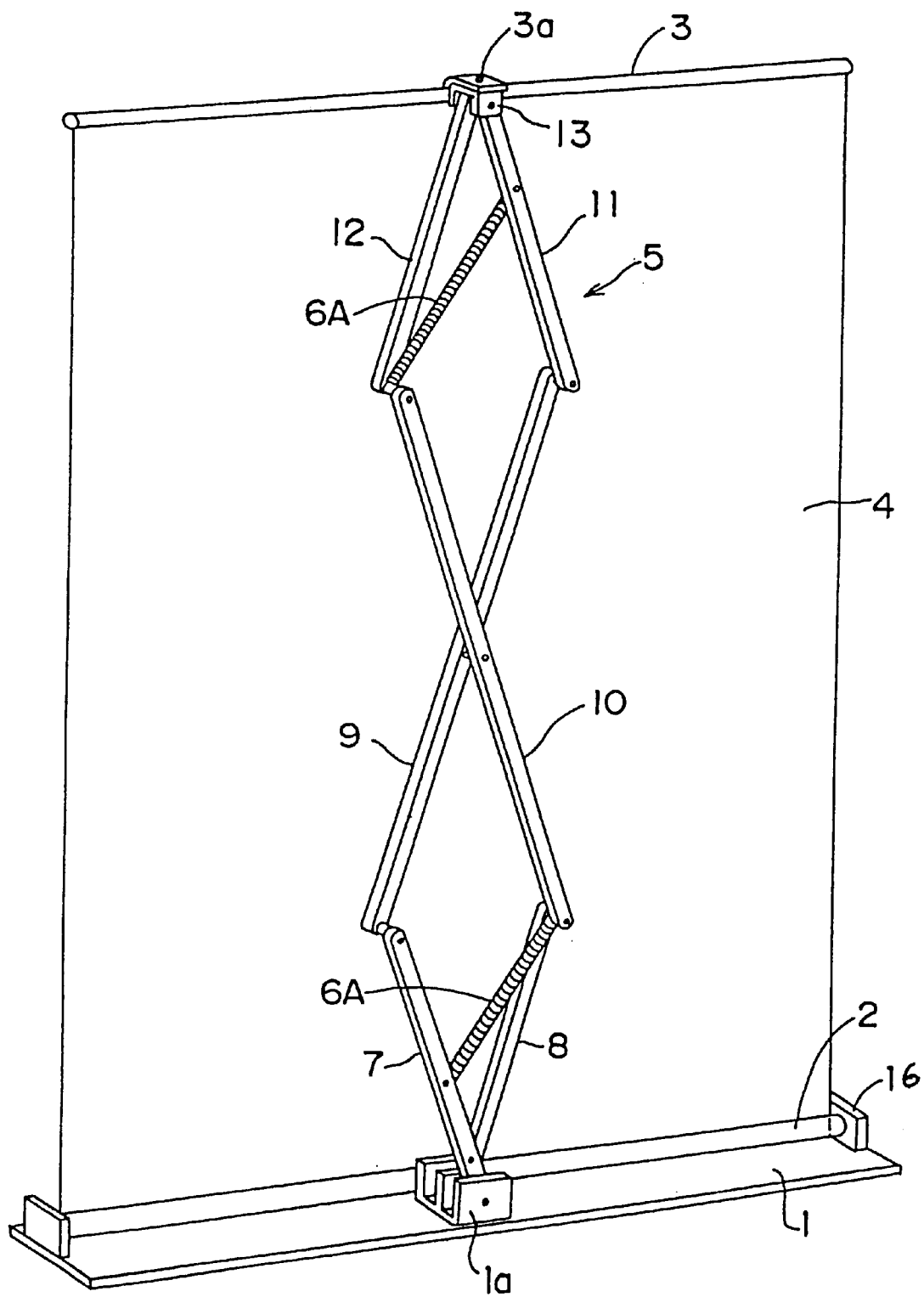
FIG. 9 is a perspective view of a portable screen assembly S1 according to second embodiment of the invention.

FIG. 9 shows the condition of a portable screen assembly S1 according to the second embodiment of the invention when in use. The construction of the screen is the same as that of the first embodiment, except that a pair of coil springs is used as height retaining means, and except that 15c is used as an arm end pair material.

One of the coil springs is preferably engaged at one end by pivotal mount portions of second arm 8 and fourth arm 10, and at the other end by first arm 7. The other coil spring is preferably engaged at one end by pivotal mount portions of the fourth arm 10 and sixth arm 12, and at the other end by fifth arm 11.

Since the coil spring exerts an upward biasing force on the top bar 3 against the elastic force of the spring of the spring-biased roll and gravitational force, the screen 4 can be set to a desired height. Further, by virtue of the frictional force of the rotatably mounted arm end pair member 15c, the screen 4 is positively prevented from falling from the set height.

Third Embodiment

Figure 12:
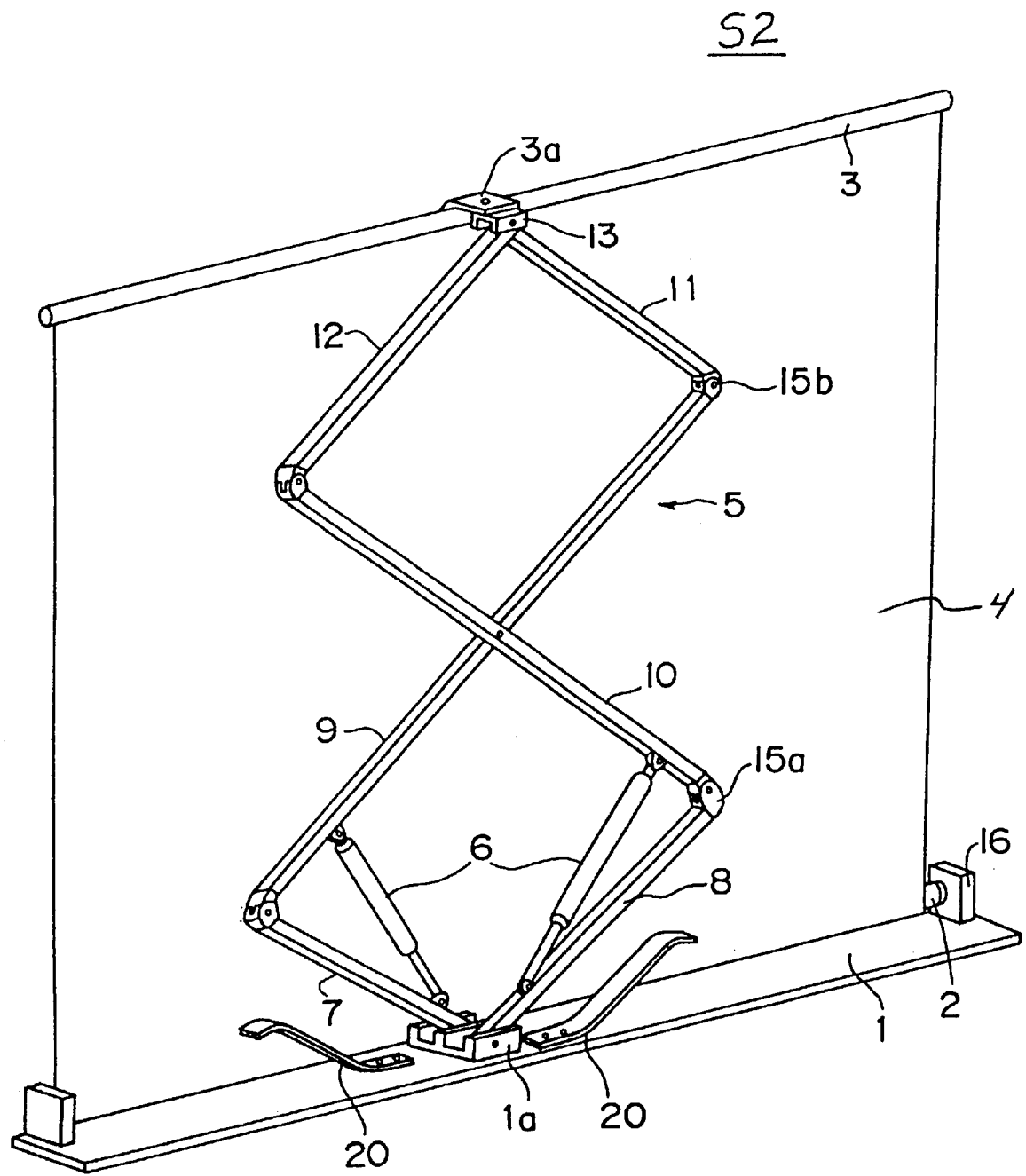
FIG. 12 is a perspective view of a portable screen assembly S2 according to third embodiment of the present invention.

FIG. 12 shows a portable screen assembly S2 according to the third embodiment when in use. The portable screen S2 is the same in construction as the first embodiment, except that a buffer means including a pair of leaf springs is fixed to the lower casing 1.

The pair of buffer means 20a, 20b are bent into S shape so that arms 7 and 8 can be received during a folding operation, with one end of each buffer means fixed adjacent to the W-shaped member 1a.

When the expansion means 5 is almost completely folded, the elastic force of the spring-biased roll and the repulsive force of the height retaining means 6 may become lowered to cause the fall of expansion means 5. However, since the buffer means 20 can receive or engage the arms 7 and 8, a collision of the expansion means 5 with the lower casing 1 is prevented and any impact upon the lower casing 1 can be alleviated by the resilient force of the expansion means 5. Thus, the occurrence of any large collision noise can be prevented. Also there is no possible danger of finger or foot injury due to a sudden fall of expansion means 5. Thus, safety during operation can be secured. Further, there is no need of increasing the frictional resistance of the hinged portions by clamping the hinged portions so as to slow down the falling of expansion means 5. Therefore, the generation of friction heat and the occurrence of unpleasant noise at the hinged portions can be prevented.

In this embodiment, a buffer means having one pair of leaf springs can be fixed to the lower casing 1 separately from the W-shaped member 1a. However, the W-shaped member 1a and the leaf springs may be attached in an integrated body to the lower casing 1.

In this embodiment, one pair of leaf springs is used. However, a pair of air dampers may be used instead of the leaf springs, in which case the same effect as the present embodiment can be obtained.

In this embodiment, one pair of leaf springs is used as the buffer means. However, one pair of coil springs may be used instead of the leaf springs. By fixing one end of each of coil springs to the lower casing to receive arms 7 and 8, the same effect as the present embodiment can be obtained.

Constructed as above described the present invention exhibits the following effects.

Since a portable screen assembly includes, an upper and a lower casing, a spring-biased roll rotatably mounted on the lower casing, a screen having first and second ends opposite to each other and wound around the spring-biased roll at a rest position, a pantograph type expansion means rotatably mounted at one end thereof to the screen and at the other end thereof to lower casing for biasing the top bar upwards, and a height keeping means engaged with a portion of the expansion means so as to maintain the screen at a desired height, a portable screen assembly which is easy to carry and handle, simple in construction, and less expensive can be provided.

One of gas spring and coil spring is used as the height retaining means. This makes it possible to set the screen to a desired height against the resilient force of the spring of spring-biased roll. In particular, by using a gas spring it is possible to fold the screen slowly after use so that any possible damage of the pantograph due to abrupt fall of the pantograph during the folding operation can be inhibited.

Since the expansion means is composed of a pantograph type expansion means having a plurality of arms rotatably attached thereto, easy operation of stretching and retreating the screen when in use, and of folding the expansion means when not in use can be attained.

Since the expansion means is rotatably attached at one end thereof to the top bar through the mounting member, the twist of screen can be easily eliminated.

Since the buffer means for alleviating any shock is provided on the lower casing, it is possible to fold the expansion means without causing any substantial shock to the lower casing.

Since the leaf spring is employed as the buffer means, any shock to the lower casing can be alleviated by the resilient force of the leaf spring.

Although the present invention has been fully described by way of examples with reference to the accompanying drawings, it is to be noted here that various changes and modifications will be apparent to those skilled in the art.

Therefore, unless such changes and modifications otherwise depart from the spirit and scope of the present invention, they should be construed as being included therein.

What is claimed is:

1. A portable screen assembly comprising:

an upper and a lower casing:

a spring-biased roll rotatably mounted on the lower casing;

a screen having first and second ends opposite to each other and wound around the spring-biased roll at a rest position;

a top bar secured to the first end of the screen;

a pantograph type expansion means for biasing the top bar upwards, the expansion means having an upper end that is rotatably connected to the top bar only at an intermediate portion thereof, and a lower end that is connected to an intermediate portion of the lower casing, wherein the top bar is capable of rotational movement in a plane that is substantially perpendicular to a surface of the screen; and a height retaining means engaged with a portion of the expansion means so as to maintain the screen at a desired height.

2. A portable screen assembly according to claim 1, wherein the height retaining means comprises one of a gas spring and a coil spring.

3. A portable screen assembly according to claim 1, wherein the expansion means comprises six arms, first and second arms being coaxially rotatably mounted at one end thereof to the intermediate portion of the lower casing, respectively, the first arm being rotatably connected at the other end thereof to one end of a third arm, the second arm being rotatably connected at the other end thereof to one end of a fourth arm crossing the third arm and rotatably engaged at the intermediate portion of the fourth arm, the other end of the third arm being rotatably connected to one end of a fifth arm, the other end of the fourth arm being rotatably connected to one end of a sixth arm, and the fifth and sixth arms being coaxially rotatably connected at the other ends thereof, and the other ends of the fifth and sixth arms are connected to the intermediate portion of the top bar so that the top bar is capable of rotatable motion in a horizontal plane relative to the other ends of the fifth and sixth arms.

4. A portable screen assembly according to claim 3, wherein the fifth and sixth arms are rotatably mounted at one end thereof to a mounting member, the mounting member being horizontally rotatably mounted relative to the top bar.

5. A portable screen assembly according to claim 3, further comprising at least one leaf spring disposed between the lower casing and at least one of the first and second arms.

6. A portable screen assembly according to claim 1, further comprising a buffer means fixed to the lower casing so as to absorb a shock exerted on the lower casing by the expansion means during a folding of the expansion means.

7. A portable screen assembly according to claim 6, wherein the buffer means comprises a leaf spring.

8. A portable screen assembly according to claim 1, wherein the height retaining means comprises:

a first gas spring connected between the first and third arms; and a second gas spring connected between the second and fourth arms.

9. A portable screen assembly according to claim 1, further comprising:

a first leaf spring mounted on the lower casing; and a second leaf spring mounted on the lower casing, wherein the first and second leaf springs are mounted on opposite sides of the lower casing relative to the lower end of the expansion means that is connected to the intermediate portion of the lower casing.

10. A portable screen assembly according to claim 1, further comprising a leaf spring disposed between the lower casing and one of the first and second arms in a completely lowered position of the expansion means, wherein the leaf spring contacts the one of the first and second arms before the expansion means reaches the completely lowered position.

11. A portable screen assembly according to claim 1, further comprising at least one leaf spring connected to the lower casing, the leaf spring having a first end that is fixed to the lower casing, and a second free end that does not engage the expansion means in an expanded position thereof, and does engage the expansion means in a collapsed position thereof.

12. A portable screen assembly comprising:

a casing;

a spring-biased roll rotatably mounted on the casing;

a screen having an upper end and a lower end connected to the spring-biased roll, wherein the screen is movable between an upper position and a lowered position at which the screen is wound around the spring-biased roll;

a top bar secured to the upper end of the screen;

a handle connected to an intermediate portion of the top bar;

an expansion device having a lower end and an upper end, said lower end of the expansion device being fixed at an intermediate portion of the casing, said upper end of the expansion device being connected to said handle such that said top bar is capable of rotational movement in a plane that is substantially perpendicular relative to a surface of the screen; and at least one height retaining device engaged with a portion of the expansion device so as to maintain the top bar at a desired height relative to the casing.

13. A portable screen assembly according to claim 12, wherein the expansion device is symmetric with respect to a longitudinal axis of the screen.

14. A portable screen assembly according to claim 12, wherein the lower end of the expansion device is connected to the intermediate portion of the casing via a W-shaped member, and the upper end of the expansion device is connected to the handle via an inverted U-shaped member.

15. A portable screen assembly according to claim 14, wherein the expansion device comprises:

first and second arms that are each coaxially pivotally mounted in the W-shaped member at a first end thereof;

a third arm having a first end that is pivotally connected to a second end of the first arm;

a fourth arm having a first end that is pivotally connected to a second end of the second arm;

a fifth arm having a first end that is pivotally connected to a second end of the third arm; and a sixth arm having a first end that is pivotally connected to a second end of the fourth arm, wherein each of said fifth and sixth arms has a second end that is pivotally connected to the inverted U-shaped member, wherein the second ends of the fifth and sixth arms are positioned in the inverted U-shaped member so as to pivot about a common axis.

16. A portable screen assembly according to claim 15, wherein said at least one height retaining device comprises a first height retaining device and a second height retaining device, wherein said first height retaining device comprises a first gas spring connected between the first and third arms, and said second height retaining device comprises a second gas spring connected between the second and fourth arms.

17. A portable screen assembly according to claim 15, further comprising at least one leaf spring disposed between the casing and at least one of the first and second arms.

18. A portable screen assembly according to claim 12, further comprising:
 a first leaf spring mounted on the casing; and
 a second leaf spring mounted on the casing, wherein the first and second leaf springs are mounted on opposite sides of the lower end of the expansion device that is connected to the intermediate portion of the casing.

19. A portable screen assembly according to claim 15, further comprising a leaf spring disposed between the casing and one of the first and second arms in a lowermost position of the expansion device, wherein when the expansion device is lowered from an expanded position the leaf spring engages the one of the first and second arms and the casing before the expansion device reaches the lowermost position.

20. A portable screen assembly according to claim 12, further comprising at least one leaf spring connected to the casing, the leaf spring having a first end that is fixed to the casing, and a second free end that is out of engagement with the expansion device in an expanded position thereof, and engages the expansion device in a collapsed position thereof.

\* \* \* \* \*